United States Patent [19]
Caldwell

[11] 3,896,586
[45] July 29, 1975

[54] SYSTEM FOR PROMOTING PLANT GROWTH

[76] Inventor: Edward Neal Caldwell, Rte. 17, Coward Mill Rd., Knoxville, Tenn. 37921

[22] Filed: July 30, 1973

[21] Appl. No.: 383,965

[52] U.S. Cl. ............................ 47/28; 47/29; 47/30; 47/38.1
[51] Int. Cl. ............................................. A01g 13/04
[58] Field of Search ........................... 47/23–32, 34, 47/41.1, 48.5, 38.1; 206/423

[56] References Cited
UNITED STATES PATENTS

| 1,701,797 | 2/1929 | Schindler | 47/28 |
| 2,759,299 | 8/1956 | Bezzerides | 47/28 X |
| 2,782,561 | 2/1957 | Smith | 47/25 |
| 2,822,644 | 2/1958 | Berger | 47/32 |
| 3,005,287 | 10/1961 | Dudley | 47/27 X |
| 3,151,415 | 10/1964 | James | 47/48.5 |
| 3,373,525 | 3/1968 | Cavataio | 47/27 |
| 3,384,992 | 5/1968 | Heffron | 47/29 |

FOREIGN PATENTS OR APPLICATIONS

| 601,788 | 7/1960 | Canada | 47/48.5 |
| 640,756 | 1/1937 | Germany | 47/26 |
| 266,726 | 9/1927 | United Kingdom | 47/32 |
| 68,643 | 10/1892 | Germany | 47/28 |
| 1,287,969 | 2/1962 | France | 47/29 |
| 821,873 | 11/1951 | Germany | 47/27 |
| 842,380 | 6/1939 | France | 47/28 |

Primary Examiner—E. H. Eickholt
Attorney, Agent, or Firm—Fitch, Even, Tabin & Luedeka

[57] ABSTRACT

A system for promoting plant growth is disclosed wherein a ground engaging member having a peripheral trough and depending root feeder elements is anchored in the ground and has a raised, apertured, central portion which ovelies a plant, and wherein a cover member having a lower peripheral generally V-shaped trough is cooperatively received within the trough of the ground engaging member, the cover member also having a raised central shield portion providing protection for the plant as it protrudes upwardly through the central aperture in the ground engaging member during growth.

1 Claim, 3 Drawing Figures

PATENTED JUL 29 1975 3,896,586

SYSTEM FOR PROMOTING PLANT GROWTH

The present invention relates generally to the promotion of plant growth, and more particularly to a novel system for use in promoting plant growth by facilitating the introduction of plant nutrients to the lower portions of the plant roots and protecting the growing plant from detrimental environmental conditions.

A principle object of the present invention is to provide a system for promoting plant growth, which system employs a ground engaging member adapted to be firmly positioned in the ground and having a peripheral trough surrounding an upstanding portion having an opening therein through which a plant rooted in the ground beneath the opening may extend, the ground engaging member further having root feeder elements depending downwardly from the trough to facilitate the introduction of plant nutrients to the lower reaches of the plant roots whereby to promote the downward direction of root growth, and a cover member adapted for cooperation with the ground engaging member and providing a shield to protect the growing plant from adverse environmental conditions.

Another object of the present invention is to provide a system for promoting plant growth wherein the ground engaging member has a peripheral flange thereon which is secured beneath the upper surface of the ground and serves to anchor the ground engaging member in generally fixed position.

Still another object of the present invention is to provide a plant promoting system wherein the upper cover member has a raised center portion providing room for plant growth, and has a lower generally V-shaped peripheral trough to receive a weight substance to maintain the cover member in cooperating relation with the ground engaging member.

Still another object of the present invention is to provide a mulch device made from a relatively inexpensive impervious sheet material formed to establish a peripheral trough between a peripheral generally inverted V-shaped wall portion and a raised central portion having a aperture therein, the mulch device being adapted to be embedded within the ground and having depending root feeder elements formed integral with the trough to receive nutrients or the like from the trough for feeding the lower reaches of the plant root whereby to promote growth thereof.

Further objects and advantages of the present invention, together with the organization and manner of operation thereof, will become apparent from the following detailed description of the invention when taken in conjunction with the accompanying drawing wherein like reference numerals designate like elements throughout the several views, and wherein.

Figure 1:
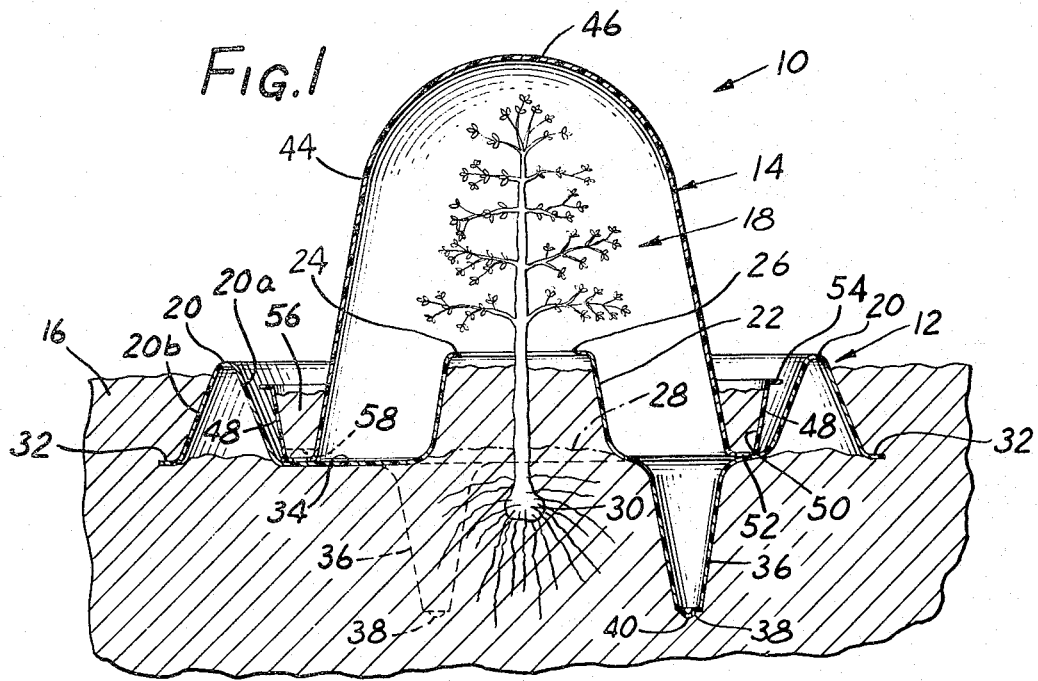
FIG. 1 is a vertical sectional view taken through the longitudinal axis of a system for promoting plant growth in accordance with the present invention, the system being shown in ground engaging position in conjunction with a plant during growth thereof.

Referring now to the drawings, and in particular to FIG. 1, a system for promoting plant growth in accordance with the present invention is indicated generally at 10. The system 10 includes a ground engaging member or mulch element, indicated generally at 12, and an upper cover member, indicated generally at 14. The upper cover member 14 is adapted for cooperating relation with the ground engaging member 12 when the ground engaging member is positioned within a ground surface 16 to promote the growth of a plant, such as indicated at 18, in a manner to be hereinafter described.

The ground engaging member 12 is preferably black in color and is made of a liquid impervious material, such as polyethylene, which lends itself to economical high production manufacturing techniques. The material from which the ground engaging member 12 is made has a thickness sufficient to maintain suitable strength characteristics under the conditions of use as hereinafter described.

Figure 2:
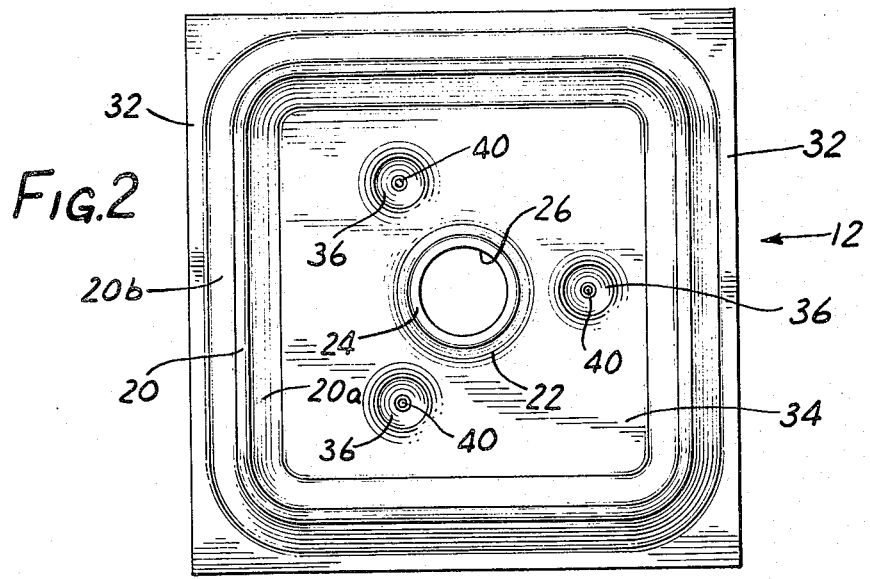
FIG. 2 is a top plan view of the lower ground engaging mulch portion of the system shown in FIG. 1.

The embodiment of the ground engaging member 12 illustrated in FIGS. 1 and 2 has a generally square plan configuration, although it may be given a rectangular or circular plan configuration. The ground engaging member 12 includes an upstanding peripheral wall portion 20 which has a generally inverted V-shaped transverse cross section having an upwardly and outwardly inclined surface 20a and a downwardly and outwardly inclined surface 20b, as considered in FIG. 1.

The ground engaging member 12 also includes an upstanding central generally truncated conical portion 22 which terminates in an upper horizontal surface 24 disposed in a plane spaced slightly above the plane containing the uppermost surface of the inverted V-shaped peripheral wall portion 20. The upper surface 24 of the upstanding central portion 22 has a circular opening or aperture 26 therethrough. The opening 26 is of a size sufficient to allow a person to introduce his hand downwardly therethrough to introduce dirt into the raised central portion 22 of the ground engaging member 12 or to root the plant 16 or otherwise manipulate it as it grows upwardly. To this end, the ground engaging member 12 is positioned in the ground 16 at a location wherein the opening 26 overlies a spot in the ground where a small plant has been planted or is to be planted. When initially positioning the ground engaging member 12 on the ground, the ground surface will be at a level shown by the phantom line 28. The plant 18 is rooted, either prior to or after positioning the member 12 on the ground, such that its root portion 30 is buried slightly below the surface 28, depending upon the particular plant being grown. Additional dirt or earth, possibly mixed with plant growth nutrients or additives, may then be introduced into the opening 26 to overlie the plant root and the lower portion of the plant stem. The earth is then packed about the outer depending surface 20b of the peripheral wall portion 20 to a level approximately level with the uppermost surface of the peripheral wall portion 20 as shown in FIG. 1. Alternatively, a shallow recess may be made in the ground to the level 28 and the ground engaging portion 12 positioned thereon. Dirt may then be introduced into the opening 26 and packed about the peripheral wall 20b as shown.

To assist in anchoring the ground engaging member 12 within the ground 16, a generally radially extending horizontal peripheral rim 32 is provided integral with the lowermost edge of the outer wall surface 20b such that the earth surrounding the peripheral wall portion 20 acts downwardly on the rim 32 to prevent accidental raising or withdrawal of the ground engaging member.

The peripheral wall portion 20 and generally central upstanding wall portion 22 of the ground engaging member 12 define a peripheral trough 34 therebetween the lower horizontal surface of which is coplanar with the aforementioned peripheral rim 32. The trough 34 has a plurality of root feeder elements 36 depending downwardly therefrom, there being three root feeder elements 36 shown in the illustrated embodiment. The root feeder elements 36 are equidistantly circumferentially spaced on a common diameter relative to the axis of the upstanding central portion 22 of the ground engaging member 12 and have their axes disposed perpendicular to the plane of the lower surface of the trough 34. Each of the root feeder elements 36 is generally conical and has its upper open end communicating with the trough 34. Each of the root feeder elements 36 has a semispherical nib 38 on the lowermost end thereof, each of the nibs having one or more openings therein to allow passage therethrough of water or other liquid plant nutrient or the like. Discharge of the liquid plant nutrient through the openings 40 in the nibs 38 serves to promote downward growth of the roots 30 of the plant 16, the root feeder elements 36 depending downwardly a distance below the initial planted depth of the root area 30 of the plant 18. The conical configurations of the root feeders 36 facilitate insertion thereof downwardly into the earth in a manner to generally surround the root portion of the plant 18.

Figure 3:
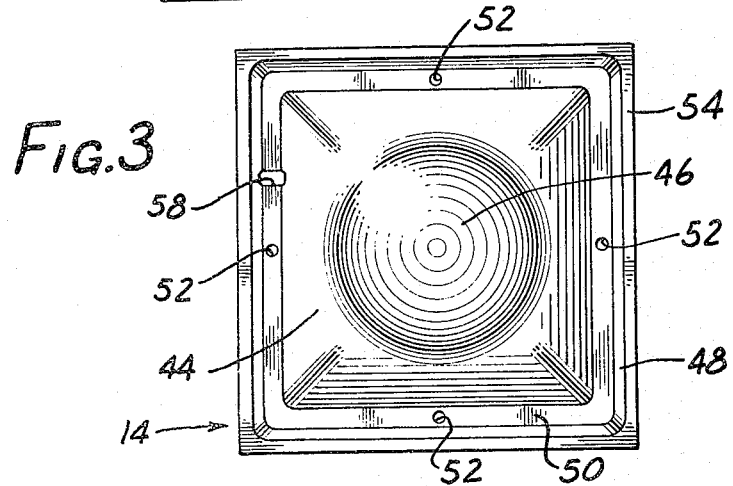
FIG. 3 is a bottom view of the upper cover portion of the system shown in FIG. 1.

Noting FIG. 1, taken in conjunction with FIG. 3, the upper cover member 14 is made of a liquid impervious sheet material, such as polyethylene, which is resistant to ultraviolet rays and has a white generally translucent character. The material from which the upper cover member 14 is made has a thickness sufficient to provide adequate strength for its intended use.

The upper cover member 14 has a central generally pyramidal shaped upstanding portion 44 which terminates at its apex in a semi-spherical upper surface portion 46. The lower peripheral edge of the central portion 44 of the upper cover 14 has an upwardly and outwardly extending wall portion 48 formed integral therewith which defines a generally V-shaped peripheral trough 50 adjacent the lower end of the cover 14. A plurality of openings 52 are provided in the lowermost surface of the trough 50 to facilitate drainage from the trough 50 when mounted on the lower ground engaging member 12.

The upwardly extending wall portion 48 of the cover member 14 terminates at its upper edge in a generally horizontal peripheral flange 54 which facilitates lifting up the cover member from the ground engaging member 12. When the cover member 14 is mounted on the ground engaging member 12 in overlying relation to the plant 18, a weighed substance, such as dirt or the like indicated at 56, may be introduced into the trough 50 to assist in maintaining the cover member 14 in cooperating relation on the ground engaging member 12.

The upper cover 14 includes at least one generally transverse channel 58 formed in the lower surface of the trough 50. The channel 58 opens downwardly and provides fluid communication between the area of the trough 34 of the ground engaging member 12 disposed outwardly of the cover wall portion 48, and the portion of the trough 34 disposed inwardly of the trough 50 in the cover member when the cover is mounted on the ground engaging member. In this manner, rain water or other liquid substances introduced into the trough 34 of the ground engaging member 12 when in ground engaging position will pass through the channel 58 and downwardly into the root feeder elements 36.

Both the ground engaging member 12 and the cover member 14 are constructed so as to be readily stackable or nestable with like ground engaging and cover members.

In operation, the ground engaging member or mulch element 12 is affixed in the ground as aforedescribed with the central opening 26 in overlying relation to a spot in which a plant 18 or plant seed has been or is to be planted in the ground. As noted, if the ground engaging member 12 is affixed within the ground prior to planting, the plant may be rooted in the ground through the opening 26. After planting, soil or soil mixed with a plant promoting nutrient may be inserted through the opening 26 to build up the earth around the plant. It will be understood that when the ground engaging member 12 is anchored within the ground, the root feeders 36 are directed downwardly into the ground so as to be generally equidistantly spaced about the plant root 30. The dirt or earth is packed against the outer wall surface 20b of the ground engaging member 12 to overlie the rim portion 32 and maintain the ground engaging member 12 in generally fixed position relative to the plant.

After positioning and affixing the ground engaging member 12 in the ground, the cover member 14 is mounted over the ground engaging member with the trough portion 50 thereof received within the trough 34 in the ground engaging member 12. Either prior to or after mounting the cover 14 on the ground engaging member 12, a weighted substance 56 may be inserted into the trough 50 in the cover member to assist in maintaining the cover member in generally fixed position and resist wind forces or other extraneous forces tending to separate the cover 14 from the ground engaging member 12.

As the plant 18 grows, it will protrude upwardly through the opening 26. The cover member 14 is provided with a height suitable to accommodate substantial growth of the plant 18 to a point at which the cover member 14 may be safely removed from the plant. Thereafter, the ground engaging member 12 may be maintained in its ground engaging position to further assist in plant growth by allowing the introduction of plant nutrients, such as rain water and the like, downwardly through the root feeders 36 to promote root growth. The ground engaging member 12 also acts as a mulch to prevent grass or weeds from growing around the plant 18 which would inhibit plant growth.

In one embodiment of the system 10 for promoting plant growth, the ground engaging member 12 was formed with an outer peripheral generally square configuration having approximately 14 inch side edge dimensions. The central upstanding portion 22 of the ground engaging member 12 was formed with a diameter of approximately 3 inches, considered at the uppermost end. The vertical height of the central portion 22 was approximately 2⅛ inches while the height of the peripheral wall 20, relative to the trough surface 34, was approximately 2 inches. The root feeder elements 36 were formed of a size to extend downwardly approximately 3 inches from the lower horizontal surface of the trough 34.

The cover 14 was provided with an overall vertical height of approximately 8 inches, with the outside dimension of the peripheral rim 54 comprising a 10½ inch square. The upper dome portion 46 has a radius of approximately 3¼ inch, and the height of the outwardly and upwardly directed wall portion 48 was approximately 1½ inches.

While a preferred embodiment of the system 10 for promoting plant growth in accordance with the present invention has been illustrated and described, it will be understood that changes and modifications may be made therein without departing from the invention in its broader aspects. Various features of the invention are defined in the following claims.

What is claimed is:

1. A system for promoting plant growth, comprising, in combination, a ground engaging member adapted to be secured in a generally fixed position on the ground, said ground engaging member including an upstanding peripheral wall portion and a generally central upstanding wall portion defining with said peripheral wall portion a continuous trough therebetween, said central portion having an opening therein to allow the protrusion therethrough of a plant rooted into the ground in underlying relation to said opening, said trough having at least one depending root feeder element integrally formed therewith adapted to be inserted into the ground so that the lower end thereof is disposed below the level of said trough, said feeder element being hollow and of generally conical geometry with its apex directed downwardly and having an open upper end communicating with said trough and into which plant nutrient may be introduced and through which water in said trough flows to enhance root growth at a level lower than the level of said trough, and a cover member including a raised central portion and a lower peripheral trough defining portion, said trough defining portion of said cover member including a generally transversely disposed channel in the lower surface thereof to provide communication between inner and outer portions of said trough in said ground engaging member when said member is mounted thereon, and being adapted to be received downwardly into said trough in said ground engaging member for cooperation therewith and being adapted to receive a weight substance therein to maintain said cover member mounted on said ground engaging member against the force of winds or the like which would tend to separate said cover from said ground engaging member, whereby said cover member shields said opening in said generally central portion thereof to protect a plant protruding through said opening.

* * * * *